United States Patent
Kameda

(10) Patent No.: US 9,128,651 B2
(45) Date of Patent: Sep. 8, 2015

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventor: Hirokazu Kameda, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/315,126

(22) Filed: Jun. 25, 2014

(65) Prior Publication Data
US 2015/0002863 A1    Jan. 1, 2015

(30) Foreign Application Priority Data
Jun. 28, 2013   (JP) ................................. 2013-137042

(51) Int. Cl.
*G06F 3/12* (2006.01)
*G06K 15/02* (2006.01)
*B41J 11/00* (2006.01)

(52) U.S. Cl.
CPC .............. *G06F 3/125* (2013.01); *B41J 11/003* (2013.01); *B41J 11/008* (2013.01); *G06F 3/1208* (2013.01); *G06K 15/1809* (2013.01)

(58) Field of Classification Search
CPC .. B41J 11/003; B41J 11/008; G03G 15/5029; G03G 15/6552; G03G 2215/00329; G03G 2215/00734; G06F 3/1208; G06F 3/125; G06K 15/4065
USPC .......................................... 358/1.1, 1.12, 1.15
See application file for complete search history.

(56) References Cited

U.S. PATENT DOCUMENTS 5,870,114 A * 2/1999 Numata et al. .................. 347/16
2013/0235109 A1 * 9/2013 Nakamaki ........................ 347/16

FOREIGN PATENT DOCUMENTS

JP            6-293163 A        10/1994

* cited by examiner

*Primary Examiner* — Iriana Cruz
(74) *Attorney, Agent, or Firm* — Canon U.S.A., Inc., IP Division

(57) ABSTRACT

In the present invention, a part of the recording elements in accordance with a position of a print medium with respect to a printing head when printing is performed after the detection is performed among the plurality of recording elements arranged in a conveyance direction during conveyance of the print medium are used for printing if the width of the print medium is detected by the sensor. Then the image of printing target of the size in accordance with the width of the print medium is printed on the print medium.

20 Claims, 9 Drawing Sheets

PRINTING APPARATUS, METHOD OF CONTROLLING PRINTING APPARATUS, AND STORAGE MEDIUM

BACKGROUND OF THE INVENTION

1. Field of the Invention

The present invention relates to a printing apparatus which prints an image of printing target on a print medium, a method of controlling printing apparatus, and a storage medium.

2. Description of the Related Art

There has been a technique for detecting a width of a print sheet and printing an image of the size in accordance with the detected width in a printing apparatus. Japanese Patent Laid-Open No. 6-293163 describes a method of detecting a width of a print sheet, in which the print sheet is conveyed such that a leading end thereof is positioned at the same alignment position as that in a case in which the detection is not performed and the print sheet is further conveyed to a detection unit where the width of the print sheet is detected. After the width of the print sheet is detected, the print sheet is conveyed in the reverse direction from the detecting position to the alignment position. Then, printing is performed.

However, in the method described above, the print sheet should be conveyed in the reverse direction after the detection of the width thereof. Such conveyance in the reverse direction requires additional time, which may prolong the time required for completing the print.

SUMMARY OF THE INVENTION

The present invention provides a printing apparatus, a method of controlling printing apparatus, and a storage medium capable of performing printing promptly when a width of a print sheet is detected.

A printing apparatus which prints an image on a print medium by a plurality of recording elements provided in a printing head, including: a conveying unit configured to convey the print medium; an acquisition unit configured to acquire a width of the print medium conveyed by the conveying unit, the width being detected by a sensor; and a printing unit configured to print, on the print medium, an image of printing target of a size in accordance with the width of the print medium using a part of the recording elements in accordance with a position of the print medium with respect to the printing head when printing is performed after the detection is performed among the plurality of recording elements arranged in a conveyance direction of the print medium conveyed by the conveying unit if the width of the print medium is detected by the sensor.

Further features of the present invention will become apparent from the following description of exemplary embodiments with reference to the attached drawings.

DESCRIPTION OF THE EMBODIMENTS

Hereinafter, an exemplary embodiment of the present invention will be described in detail.

Figure 1:
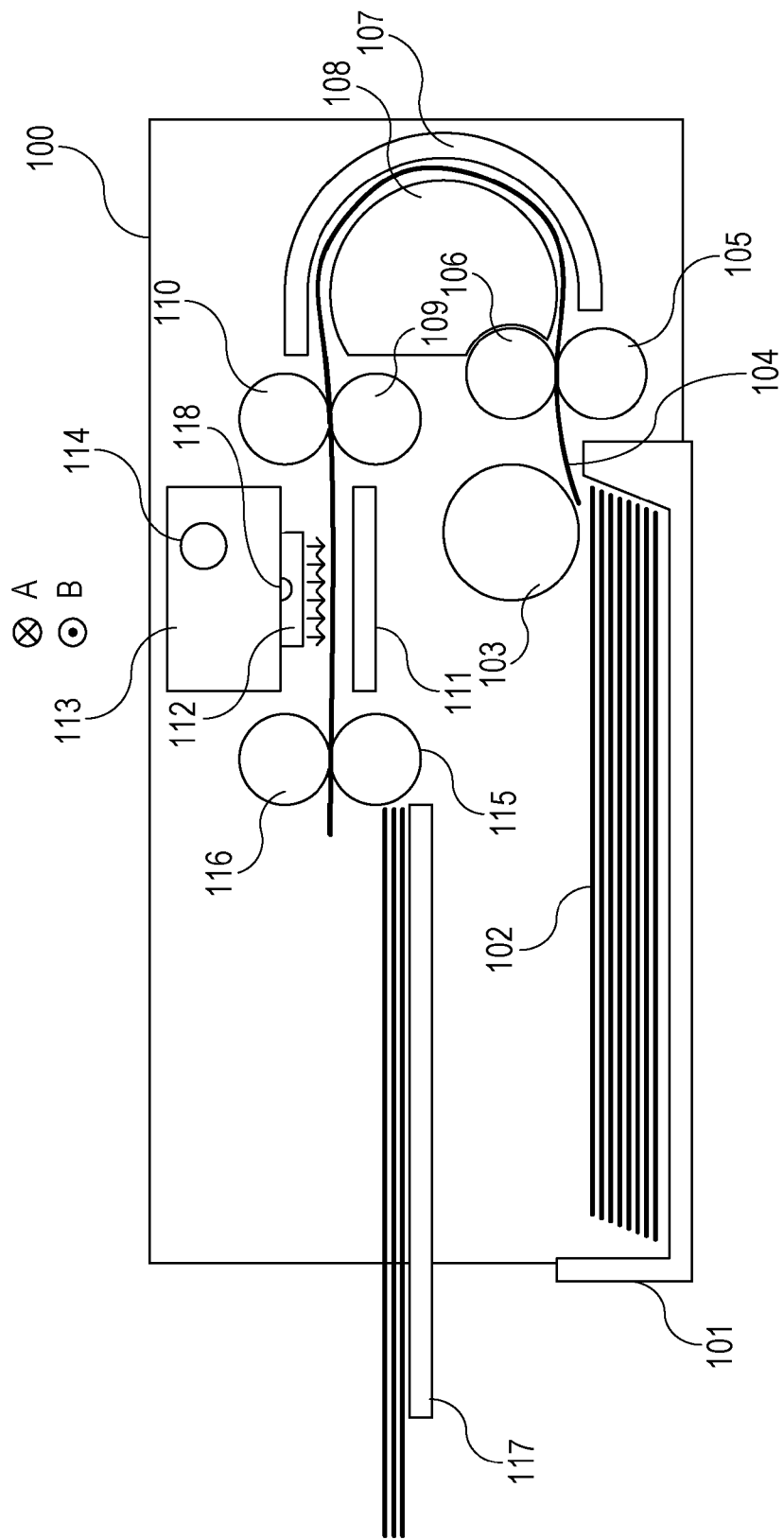
FIG. 1 is a configuration diagram illustrating a configuration of a printing mechanism in a printing apparatus.

FIG. 1 is a diagram illustrating a printing mechanism provided in a printing apparatus 100 of the present embodiment. Print sheets are stored in a feed tray 101. A feed roller 103 feeds the print sheets stored in the feed tray 101 to conveying rollers 105 and 106. A print sheet 104 is a print sheet fed by the feed roller 103 and conveyed by the conveying rollers 105 and 106. As illustrated in FIG. 1, the print sheet 104 is conveyed by the conveying rollers 105 and 106 along a conveying path defined by members 107 and 108 and is conveyed to conveying rollers 109 and 110. The conveying rollers 109 and 110 convey the print sheet 104 to a platen 111.

A carriage 113 on which the printing head 112 is mounted is provided above the platen 111. The carriage 113 performs reciprocal scanning along a guide rail 114 in the A direction (a direction from near side to far side of FIG. 1) and the B direction (a direction from far side to near side of FIG. 1).

A plurality of ejecting portions for ejecting a recording agent, such as ink, are provided in the printing head 112 as recording elements. The printing head 112 is attached to the carriage 113 so that the plurality of ejecting portions are arranged in the conveyance direction of the print sheet 14. The printing head 112 may be attached to the printing apparatus 100 such that the plurality of ejecting portions are arranged in an inclined manner with respect to the conveyance direction of the print sheet 104 or, alternatively, the printing head 112 may be manufactured such that the plurality of ejecting portions are arranged in an inclined manner with respect to the conveyance direction. Further, the plurality of ejecting portions may be arranged in an inclined manner with respect to the conveyance direction due to a mounting error of the printing head 112 on the printing apparatus 100 or a manufacturing error of the printing head 112.

The printing apparatus 100 applies driving pulses to the printing head 112 while making the carriage 113 scan in the direction A and the direction B to cause the recording agent, such as ink, to be ejected from the printing head 112. In this manner, the recording agent is ejected from the printing head 112 onto the print sheet 104 to cause an image of printing target to be printed on the print sheet 104. The print sheet 104 having an image printed thereon is further conveyed to discharge rollers 115 and 116 by the conveying rollers 109 and 110. The discharge rollers 115 and 116 discharge the print sheet 104 to an output tray 117.

A sheet sensor 118, which is a reflective optical sensor, is provided in the carriage 113. The printing apparatus 100 acquires an output level (an output voltage) which represents intensity of light received by the sheet sensor 118 and determines whether the output level corresponds to light reflected from the print sheet 104. In this manner, the printing apparatus 100 may detect existence of the print sheet 104 at the position at which the light is received. As described above, the sheet sensor 118 is provided in the carriage 113 and is made to scan together with the printing head 112. The printing apparatus 100 may determine an end portion of the print sheet 104 by detecting existence of the print sheet 104 in that range in a scanning range in which the sheet sensor 118 scans the print sheet 104. The width of the print sheet 104 may be detected in accordance with a distance between the right and left end portions of the print sheet 104. Details of the detection processing will be described with reference to FIGS. 2A and 2B. A scanning position of the sheet sensor 118 (the carriage 113) is detected by an encoder 224 which will be described later.

The printing apparatus 100 includes, as a printing mechanism, the feed tray 101, the platen 111, the printing head 112, the carriage 113, the guide rail 114, the output tray 117 and various rollers described above.

The sheet sensor 118 is provided in the carriage 113 together with the printing head 112 as described above. Members including various motors for moving the carriage 113, the guide rail 114 and an encoder 224 for specifying the position of the carriage 113 are used both for the printing by the printing head 112 and for the detection of the sheet width by the sheet sensor 118. Therefore, it is not necessary to provide a member for the detection of the sheet width separately from the member for the printing, whereby an increase in size of the printing apparatus 100 may be avoided.

In the foregoing description, the sheet sensor 118 is provided at the center of the printing head 112; however, as another configuration, the sheet sensor 118 may be provided at any positions other than the center of the printing head 112. Alternatively, the sheet sensor 118 may be provided on a conveyance path or outside the carriage 113 instead of on the carriage 113. For example, the width of the print sheet 104 may be determined by disposing sheet sensors of the number corresponding to the width of the conveying path of the print sheet 104 side by side and by determining whether each sheet sensor has detected the existence of the print sheet 104.

Figure 2A:
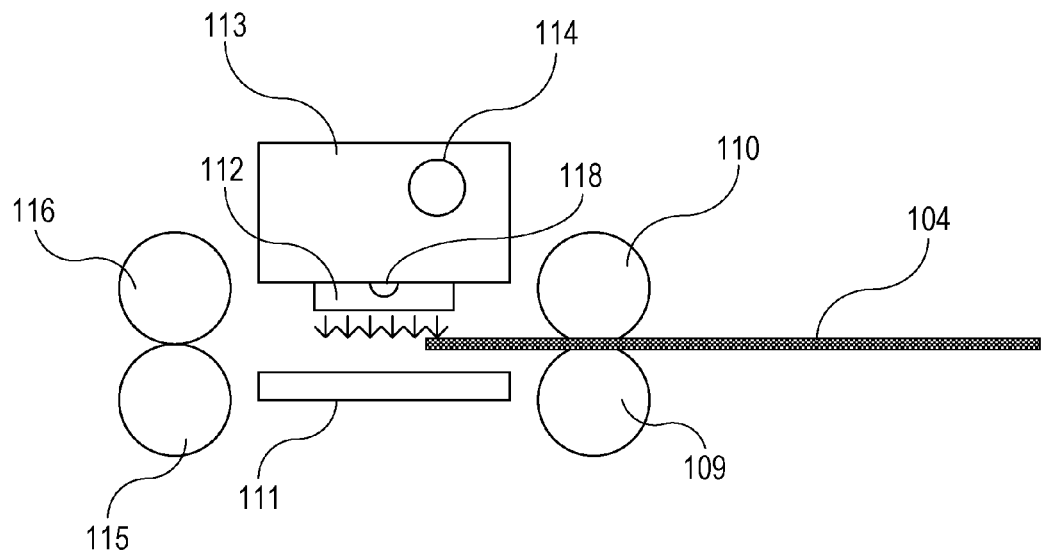
FIGS. 2A and 2B are diagrams illustrating a printing process executed at a leading end of a print sheet in the printing apparatus.
Figure 2B:
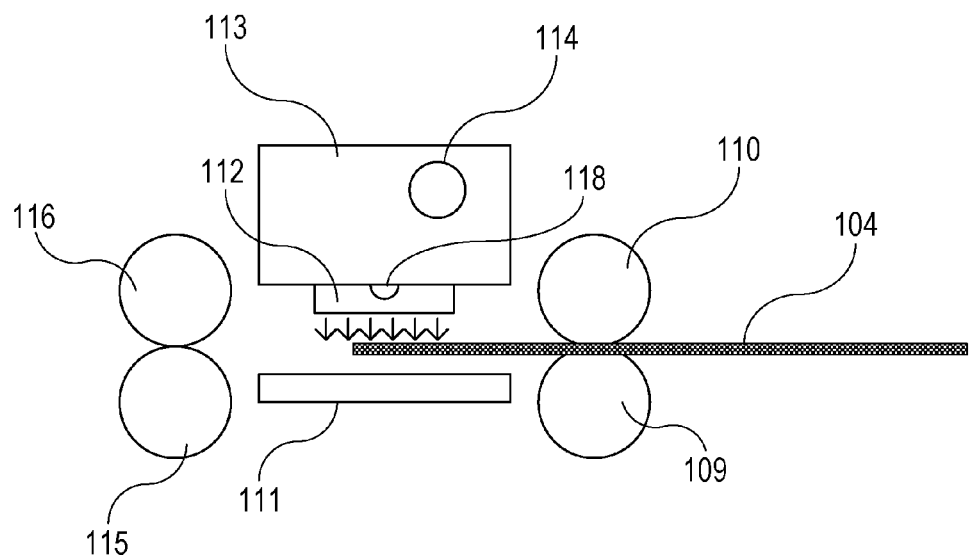

FIGS. 2A and 2B are diagrams illustrating a printing process executed at a leading end of the print sheet 104 in the printing apparatus 100. FIG. 2A is a diagram illustrating a printing process executed at a leading end of the print sheet 104 in a case in which detection of the width of the print sheet 104 by the sheet sensor 118 is not performed. In this case, since the width of the print sheet 104 is not detected, printing may be started without the need to conveying the print sheet 104 to the position below the sheet sensor 118 illustrated in FIG. 2A. Therefore, if the image of printing target is to be printed at the leading end of the print sheet 104, printing at the leading end of the print sheet 104 is performed by ejecting the ink from the nozzle of the right end of the printing head 112 illustrated in FIG. 2A.

FIG. 2B is a diagram illustrating a case in which the width of the print sheet 104 is detected by the sheet sensor 118. In the present embodiment, the sheet sensor 118 detects the width of the print sheet 104 and the size of the print sheet 104 is specified in accordance with the detected width. An image of printing target is created in accordance with the specified size and the image is printed on the print sheet 104. Therefore, the width of the print sheet 104 cannot be detected unless the print sheet 104 is conveyed to the position below the sheet sensor 118 illustrated in FIG. 2B nor printing cannot be started. Therefore, if the image of printing target is to be printed at the leading end of the print sheet 104, after the print sheet 104 is conveyed at the position below the sheet sensor 118, printing is started using the nozzle at the position of the sheet sensor 118 or a nozzle located on the left side of the sheet sensor 118.

When FIG. 2A and FIG. 2B are compared, it is understood that different nozzles of the printing head 112 are to be used for the leading end of the print sheet 104 depending on whether the width of the print sheet 104 is not detected (FIG. 2A) or is detected (FIG. 2B).

Then, in the present embodiment, different nozzles are selectively used for a predetermined area of the image of printing target (for example, the leading end) depending on whether the width of the print sheet 104 is detected. Specifically, in a case in which the width of the print sheet 104 is detected, different nozzles are selectively used for the predetermined area (for example, the leading end) by shifting image data of printing target to the nozzles of the printing head 112. Hereinafter, details of the above-described process will be described.

Figure 3:
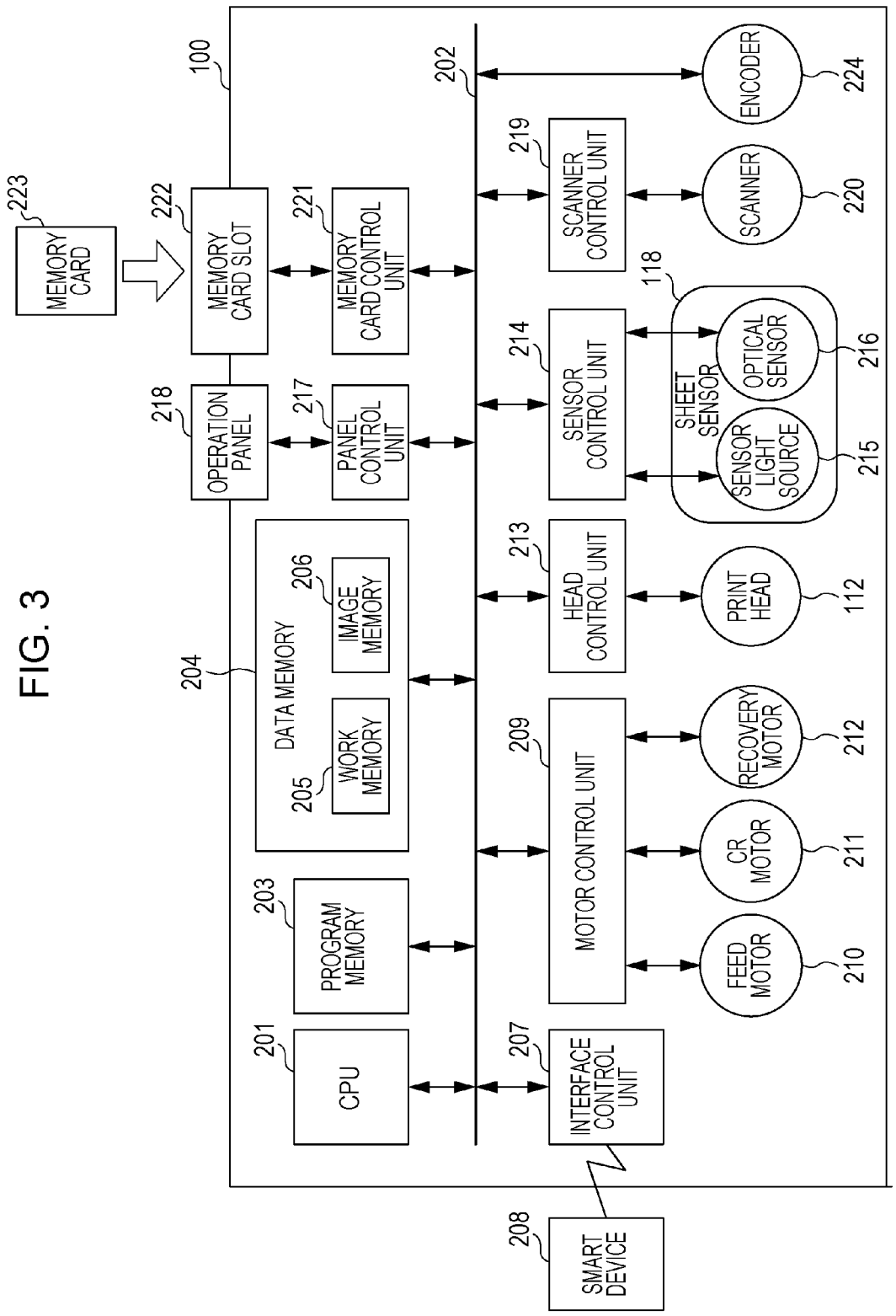
FIG. 3 is a block diagram illustrating a configuration of the printing apparatus.

FIG. 3 is a block diagram illustrating a configuration of the printing apparatus 100.

A CPU 201 is a processor which controls the printing apparatus 100. The CPU 201 is connected to program memory 203, such as ROM and hard disk, and data memory 204, such as RAM, via an internal bus 202. Programs for controlling the printing apparatus 100 are stored in the program memory 203. The CPU 201 may control the printing apparatus 100 by reading the programs stored in the program memory 203 to the data memory 204 and executing the programs on work memory 205 allocated to the data memory 204. Image memory 206 is also allocated to the data memory 204 and various types of data, such as image data to be printed in the printing apparatus 100, is developed in the image memory 206 by the CPU 201.

An interface control unit 207 communicates with a smart device 208, such as a smartphone, via an interface under the control of the CPU 201. For example, a job of printing target may be received from the smart device 208 and the smart device 208 may be notified of status information of the printing apparatus 100. The interface control unit 207 may communicate via a wired interface, such as a universal serial bus (USB) cable, or via a wireless interface, such as infrared ray communication and wireless LAN. The smart device 208 is, for example, a smartphone and a tablet terminal. The portable terminal, such as a mobile phone and a PDA, may operate as the smart device 208 in the present embodiment.

A communication destination is not limited to the smart device 208 and may be a personal computer. In addition, the communication destination may be a server which is connected via a network, a facsimile machine connected via a telephone line, and a device, such as a digital television receiver connected via a television circuit. The data of printing target is not necessarily included in the print job but may be acquired by the printing apparatus 100 from an external device, such as a server, in accordance with address information included in the print job.

A motor control unit 209 controls various motors for driving the printing mechanism of the printing apparatus 100 under the control of the CPU 201. A feed motor 210 drives the feed roller 103, the conveying rollers 105, 106, 109 and 110, and the discharge roller 115 and 116 which are illustrated in FIG. 1 under the control of the motor control unit 209. A carriage motor 211 (a CR motor) drives the carriage 113 under the control of the motor control unit 209 to cause the carriage 113 to reciprocate. A recovery motor 212 drives a head recovery mechanism 119 under the control of the motor control unit 209.

A head control unit 213 controls the printing head 112 under the control of the CPU 201 and causes the printing head 112 to eject the recording agent, such as ink. The CPU 201 drives both the printing head 112 and the feed motor 210 so that an image is printed on the print sheet 104 while making the printing head 112 scan. That is, the CPU 201 in the printing apparatus 100 operates as a printer controller, controls various motors as the printing mechanism and the printing head 112, and causes the printing mechanism to print an image.

The sensor control unit 214 causes a sensor light source 215 included in the sheet sensor 118 to emit light under the control of the CPU 201 and causes an optical sensor 216 provided in the sheet sensor 118 to receive reflected light. The sensor control unit 214 acquires an output level which represents intensity of light received by the optical sensor 216. The CPU 201 may determine the sheet width illustrated in FIGS. 2A and 2B by acquiring the output level acquired by the sensor control unit 214. The CPU 201 determines the sheet size including a sheet length in accordance with the sheet width determined as described above by a process described later.

A panel control unit 217 controls an operation panel 218 under the control of the CPU 201. The operation panel 218 includes an operation device, such as a key and a touch panel, on which a user performs operation, and a display panel which may display various types of information, including an image. For example, when the user operates the operation device of the operation panel 218, an instruction of the user is input in the panel control unit 217 and the instruction is then input in the CPU 201. The panel control unit 217 displays an image developed by the image memory 206 on the display panel of the operation panel in response to the instruction of the CPU 201.

The scanner control unit 219 controls a scanner 220 under the control of CPU 201 to cause the scanner 220 to read a document placed on a document table of the scanner 220 and inputs the read image. The scanner control unit 219 stores the read image in the image memory 206. A memory card control unit 221 writes in and reads from various types of data under the control of the CPU 201 with respect to a memory card 223 inserted in a memory card slot 222.

An encoder 224 specifies a position of the carriage 113 when the carriage 113 scans along the guide rail 114. The CPU 201 specifies the position of the sheet sensor 118 when the sheet sensor 118 scans in the direction A and the direction B in FIG. 1 in accordance with the position of the carriage 113 specified by the encoder 224 and the position at which the sheet sensor 118 is fixed to the carriage 113.

In the present embodiment, the CPU 201 determines the sheet size including the sheet length in accordance with the sheet width determined by the sheet sensor 118 as described above. In the printing apparatus 100 of the present embodiment, the sheet sensor 118 is provided in the carriage 113 together with the printing head 112. Various motors and the guide rail 114 for moving the carriage 113, and a member, such as the encoder 224, for specifying the position of the carriage 113 are used both for the printing by the printing head 112 and for the detection of the sheet width by the sheet sensor 118. Therefore, it is not necessary to provide a member for the detection of the sheet width separately from the member for the printing, whereby an increase in size of the printing apparatus 100 may be avoided.

Figure 4:
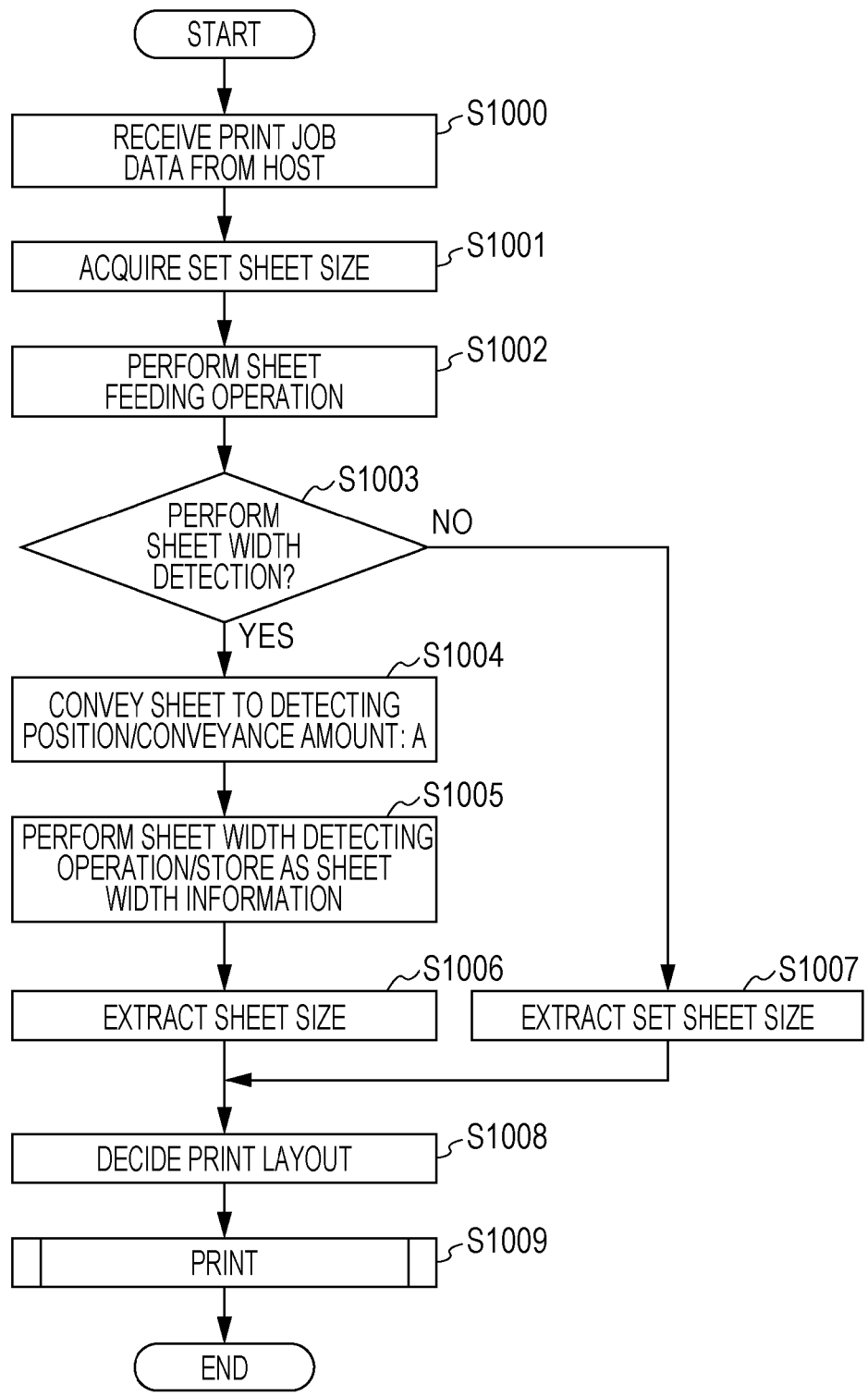
FIG. 4 is a flowchart illustrating details of processing of a CPU when printing is executed.
Figure 5:
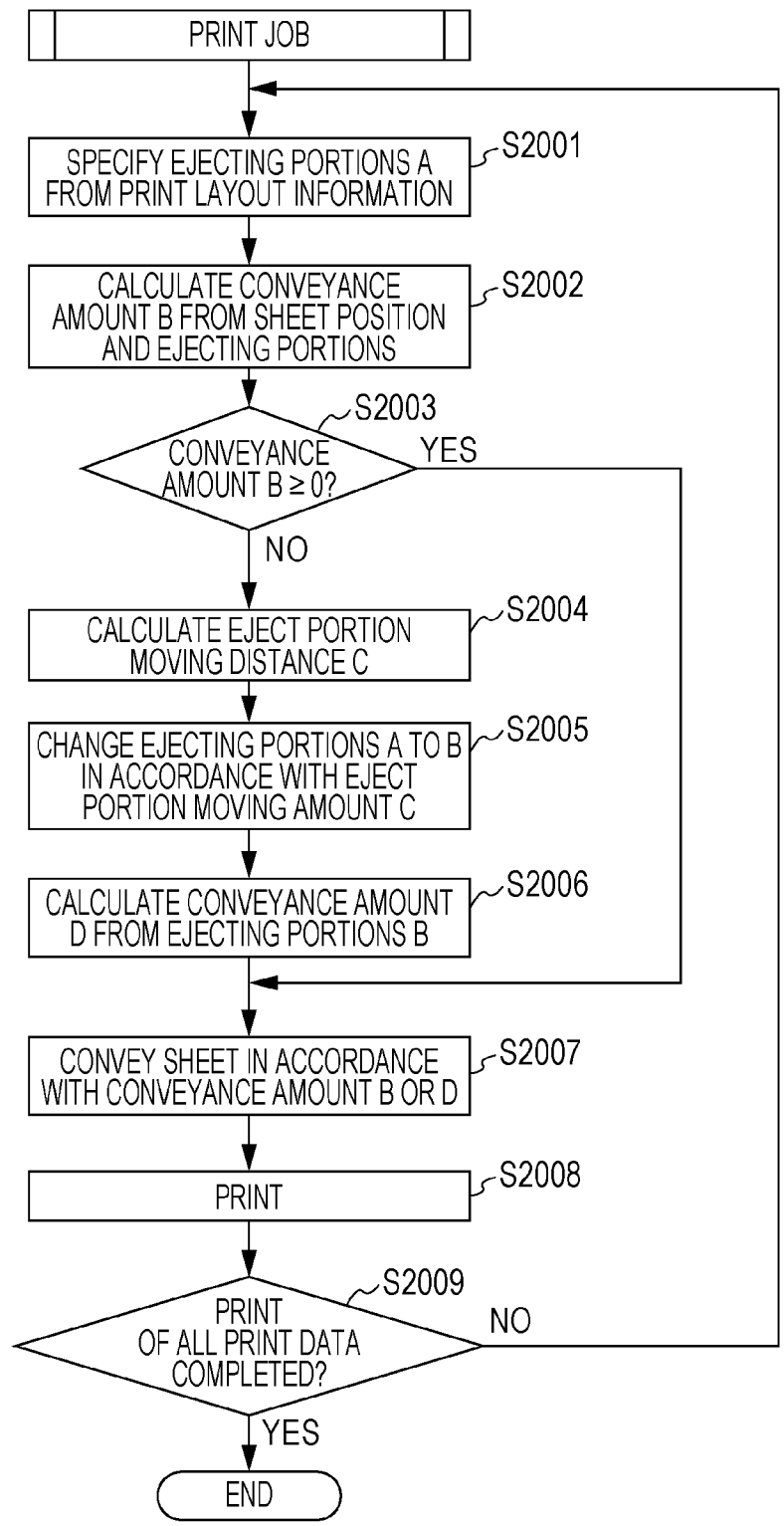
FIG. 5 is a flowchart illustrating details of the printing process.

FIG. 4 is a flowchart illustrating details of processing of the CPU 201 when printing is executed in the present embodiment. Programs for implementing the process of the flowchart of FIG. 4 are stored in the program memory 203. The CPU 201 reads the programs to the work memory 205 and executes the programs on the work memory 205, whereby the process of the flowchart illustrated in FIG. 5 is implemented.

In S1000, the CPU 201 receives print job data from a host device, such as the smart device 208, and stores the data in a predetermined area of the data memory 204. The thus-received print job data sequentially undergoes command analysis by the CPU 201 and processes in accordance with each command are performed.

In S1001, the CPU 201 acquires the sheet size set as print option setting for the print job from among a command group of the print job data (a set sheet size) and stores the acquired sheet size in a predetermined area of the work memory 205 as the set sheet size.

Next, the process proceeds to S1002 where the CPU 201 controls the printing mechanism to perform a sheet feeding operation. The uppermost print sheet 104 of the print sheets 104 stacked on the feed tray 101 is picked by the feed roller 103 and is conveyed to a position where the leading end of the print sheet 104 is located at the position of the platen 111.

In S1003, the CPU 201 determines whether the print job received in S1000 is a job for detecting the width of the print sheet in accordance with sheet width detection information included in the command group of the print job data. The sheet width detection information is included in the print job and determination is performed using this information in S1003. The sheet width detection information may be various types of information. For example, an instruction by the user to detect the width of the print sheet may be included in the print job as the information. Further, sheet type (regular paper, glossy paper, and the like) set as the print option setting in the print job received in S1000 may be used as the sheet width detection information and, if the sheet type is a predetermined type, the width of the print sheet may be detected. For example, a print sheet of glossy paper may often be more expensive than a print sheet of regular paper. Then, if the sheet type is glossy paper, the width of the print sheet is detected to check the size of the print sheet that is actually used for printing by the printing apparatus 100 before starting printing. In this manner, a situation in which an inappropriate printing is performed on an expensive print sheet may be avoided. The set sheet size acquired in S1001 may be used as the sheet width detection information and, if the set sheet size is a predetermined size, the width of the print sheet may be detected. For example, print sheets of "L size" (89 mm×127 mm), "2 L size" (127 mm×178 mm), or "4×6 size" (127 mm×188 mm) are often used for printing photographs and are often more expensive than print sheets used for printing text. Then, when the set sheet size is "L size" (89 mm×127 mm), "2 L size" (127 mm×178 mm), or "4×6 size" (127 mm×188 mm), a situation in which an inappropriate printing is performed on an expensive print sheet may be avoided by detecting the width of the print sheet.

In S1003, whether the width of the print sheet 104 is to be detected may be determined in accordance with the type of the host device (for example, the smart device 208) which issued the print job received in S1000 or the application which issued the print job. For example, while receiving a print job, information representing the type of the host device may be received and determination in S1003 may be performed in accordance with the information. Whether the width of the print sheet is to be detected may be determined in accordance with a communication protocol used during reception of the print job.

Further, the sheet width detection information is not necessarily acquired from the print job but may be acquired from the printing apparatus 100. For example, a print mode set in the printing apparatus 100 may be acquired as the sheet width detection information. For example, if a function for printing photographs is being executed, it is determined that the width of the print sheet is to be detected. If it is set in the printing apparatus 100 or in the print job which is more important in the printing: quality or speed, whether the width of the print sheet is to be detected may be determined in accordance with the setting.

If the print job received in S1000 is an instruction of printing on a plurality of print sheets, e.g., printing on a plurality of pages, the width may be detected for each of a plurality of print sheets or may be detected only for the first page. Since the detection of the width of the print sheet of the second sheet and thereafter may be omitted and thus time before printing on a plurality of print sheets is completed may be shortened. In this case, in S1003, whether the width of the print sheet is to be detected is determined depending on whether the print sheet conveyed in S1002 is a print sheet corresponding to the first page of the print job. Even if the detection of the width of the print sheet of the second sheet and thereafter is omitted in this manner, since the sheet size may be changed when an error occurs due to lack of sheet, paper jam and the like, determination in S1003 may be performed such that the detection of the sheet width is performed again after the recovery from the error.

If it is determined in S1003 that the width of the print sheet is to be detected in the printing, the process proceeds to S1004 and, if the determination is not performed, the process proceeds to S1007.

In S1004, the CPU 201 causes the printing mechanism to convey the print sheet from a position of the print sheet after the sheet feeding operation in S1002 to a sheet width detection position at which the sheet sensor 118 detects the sheet width. A conveyance amount at this time will be referred to as a conveyance amount a. In the present embodiment, the position at which the print sheet is fed in S1002 and the sheet width detection position described above are fixed, and the conveyance amount a is a fixed value. However, the conveyance amount a may be a variable value.

In S1005, the CPU 201 controls the carriage 113 and the sheet sensor 118 to cause the sheet sensor 118 to detect the width of the print sheet 104, and stores the detected sheet width in a predetermined area of the work memory 205 as the sheet width information.

Next, in S1006, the CPU 201 determines the sheet size in accordance with the sheet width information stored in S1005 and stores the determined sheet size in a predetermined area of the work memory 205. Specifically, a table in which sheet widths of various standard sizes and the standard sizes are correlated is stored in the program memory 203 and the table is looked up in S1006. A sheet of standard size corresponding to the sheet width detected in S1005 is conveyed in the printing apparatus 100 and is determined as the size of a print sheet used for printing. Then information representing the standard size is stored in the predetermined area. In the present embodiment, the sheet size is not necessarily limited to the standard size but, for example, may be a user-defined size of which width and length are defined by the user.

In S1005, the set sheet size acquired in S1001 may be looked up. If the width of the print sheet detected by the sheet sensor 118 differs from the width of the set sheet size greatly, the process may not proceed to subsequent processes and the CPU 201 may control to discharge the print sheet so that printing is not performed on that print sheet. At this time, the CPU 201 may display an error message indicating that the printing has been canceled on the operation panel 218 via the panel control unit 217.

If it is determined in S1003 that the detection of the width of the print sheet is not to be performed, the process proceeds to S1007. In S1007, the sheet size of the print option setting acquired in S1001 (set sheet size) is specified as the size of the print sheet 104 currently conveyed in the printing apparatus 100 and information representing the size is stored in a predetermined area of the work memory 205.

When the size of the print sheet is specified in S1006 or S1007, the process proceeds to S1008.

In S1008, the CPU 201 reads size information of the print sheet from the predetermined area of the work memory 205 and determines the size of a print layout area in accordance with the size of the print sheet specified in S1006 or S1007. This layout area is provided on the image memory 206.

Then, in S1009, the CPU 201 develops an image of printing target corresponding to the print job received in S1000 to the print layout area of the size determined in S1008 and causes the printing head 112 to print the image on the print sheet 104. In S1009, the CPU 201 shifts the image of printing target depending on the determination result in S1003 (i.e., whether the width of the print sheet is to be detected). Details of the process in S1009 will be described later with reference to FIG. 5.

Figure 6:
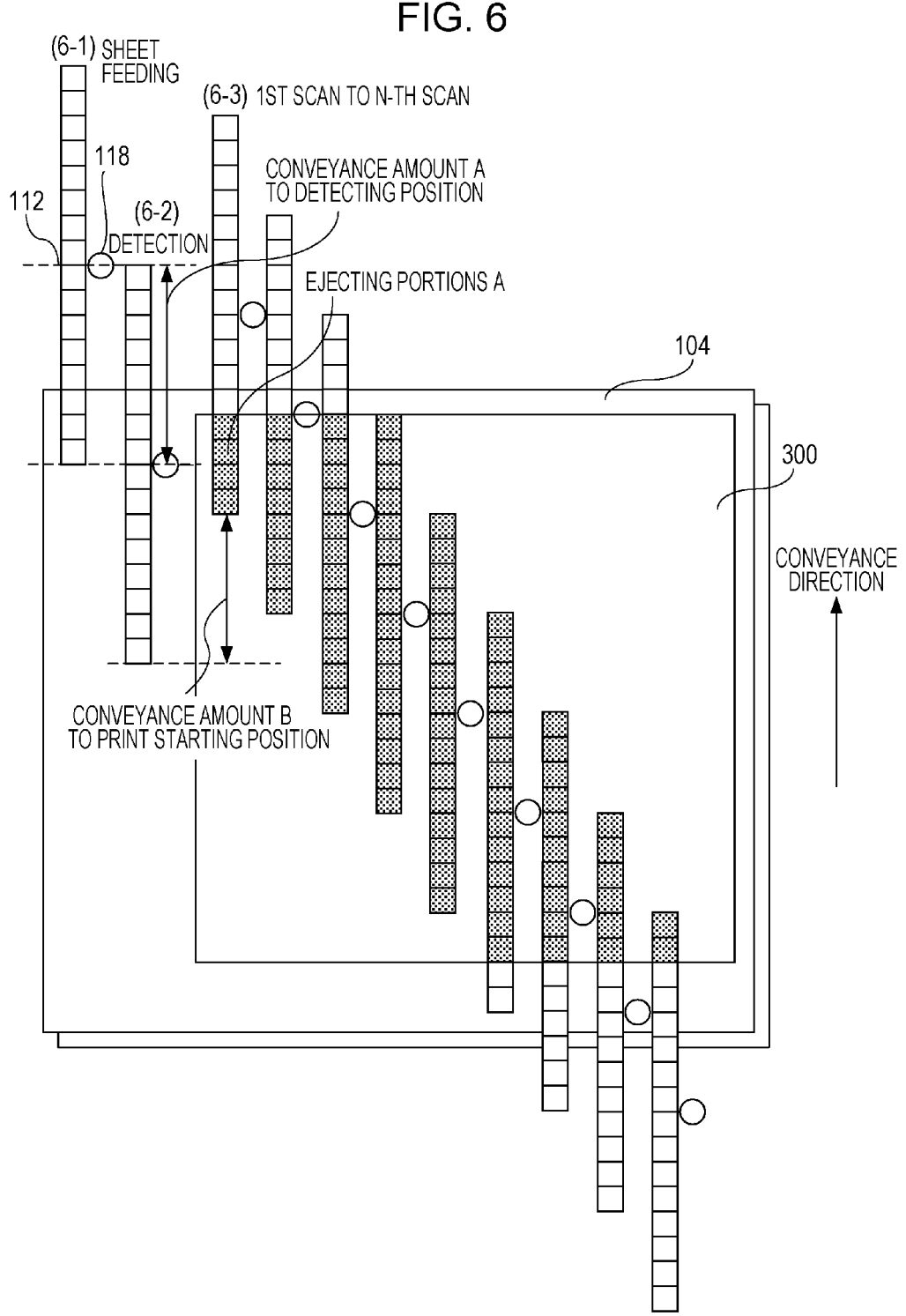
FIG. 6 is a diagram illustrating a relationship among a print sheet, a printing head, and an ejecting portion of the printing head in a case in which the print sheet is fed backward after a width thereof is detected.

FIG. 6 is a diagram illustrating a relationship among the print sheet 104, the printing head 112, and the ejecting portions of the printing head 112 in a case in which the print sheet 104 is fed backward after a width thereof is detected. FIG. 6 illustrates state transition during multipass printing of a page when the printing apparatus 100 is seen from above.

In FIG. 6, an example in which an image 300 of printing target is compensated in four scanning events on the paper sheet is illustrated. A part (for example, ¼) of the ejecting portions of the printing head 112 (the nozzles arranged in the printing head) are used in a switched manner for each scan line (path) of the printing head 112. However, the combination of the number of scanning events and ejecting portions to be used is not particularly limited. In FIG. 6 and the later-described FIGS. 7 and 8, the printing head 112 is illustrated as a moving part to illustrate a relative positional relationship between the printing head 112 and the print sheet 104. However, in the configuration of the printing apparatus 100, the print sheet 104 is moved with respect to the printing head 112. The present embodiment may also be applied to a configuration in which the printing head 112 is moved with respect to the print sheet 104.

(6-1) Sheet Feeding

A relative positional relationship of the printing head 112 with respect to the print sheet 104 after the sheet feeding operation is performed in S1002 of FIG. 4 is illustrated.

(6-2) Detection

A relative positional relationship of the printing head 112 with respect to the print sheet 104 after the print sheet 104 is conveyed by the conveyance amount a to the sheet width detecting position in S1004 is illustrated. As described above, the sheet sensor 118 is provided at the center of the printing head 112 in the conveyance direction of the print sheet 104. Therefore, unless the print sheet 104 is conveyed to the position of (6-2) in FIG. 6, the width of the print sheet 104 is not detectable by the sheet sensor 118.

In the example of FIG. 6, after the width of the print sheet 104 is detected, the print sheet 104 is conveyed in the reverse direction in order to print an image of the size in accordance with the detected width on the print sheet 104. Details will be described in (6-3).

(6-3) First to N-Th Scanning Events of Printing Head 112

In the example of FIG. 6, after the detection of the width of the print sheet 104, the print sheet 104 is conveyed in the reverse direction by a conveyance amount b illustrated in FIG. 6 and printing is performed. That is, the print sheet 104 is conveyed in the reverse direction to the position where printing is started if the width of the print sheet 104 is not detected. The conveyance amount in the reverse direction at that time is the amount b.

After the print sheet 104 is conveyed in the reverse direction as described above, printing is performed at the first to N-th scanning events of the printing head 112 using a part of the nozzles colored gray in (6-3) of FIG. 6 (ejecting portions A). Specifically, the image 300 of printing target is printed by repeating conveyance of the print sheet 104 in the forward direction and ejection of the recording agent, such as ink, from the nozzles of the printing head 112. In the example of FIG. 6, printing is started at the first scanning event using a part (¼) of the ejecting portions of the printing head 112 as the ejecting portions A. Then the range of the ejecting portions to be used is expanded sequentially and, finally, all the ejecting portions of the printing head 112 are used for printing.

As described above, in the example of FIG. 6, if the width of the print sheet is to be detected, the print sheet should be conveyed in the reverse direction to the position where the printing is started in a case in which the detection is not performed, whereby additional configuration and time are required for the conveyance in the reverse direction.

Next, details of a printing process for not conveying the print sheet in the reverse direction in the present embodiment will be described.

Figure 7:
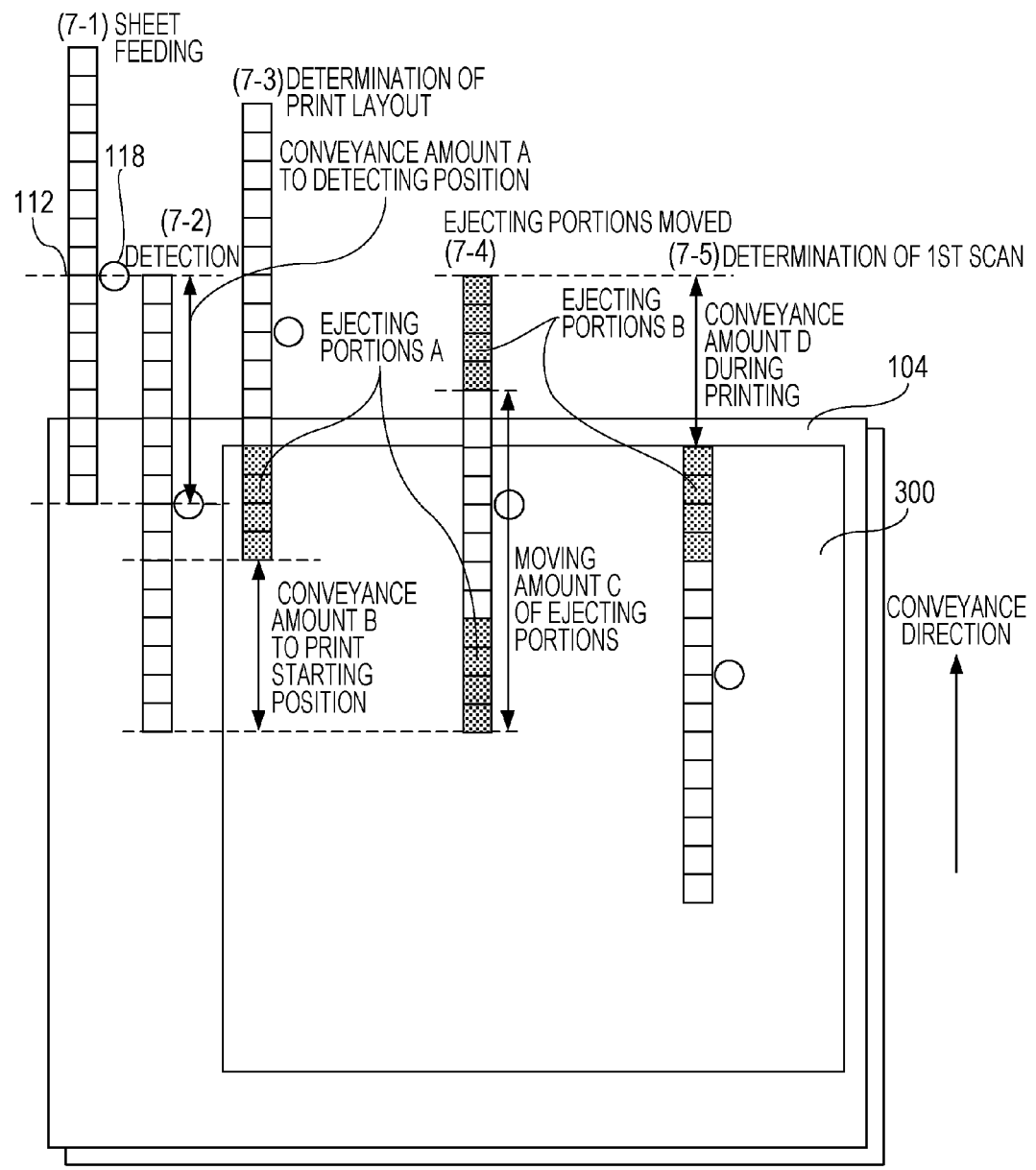
FIG. 7 is a diagram illustrating details of the printing process in the present embodiment.

FIG. 7 is a diagram illustrating details of the printing process in the present embodiment. FIG. 7 illustrates, in time series, a relative positional relationship of the printing head 112 and the ejecting portions of the printing head 112 with respect to the print sheet 104 seen from above of the printing apparatus 100. In FIG. 7, an example in which an image 300 of printing target is compensated in four scanning events on the paper sheet is illustrated like FIG. 6. In that case, printing is performed using ¼ of the ejecting portions of the printing head 112. However, the combination of the number of scanning events and ejecting portions to be used is not particularly limited.

(7-1) Sheet Feeding

In the same manner as (6-1) described above, a relative positional relationship of the printing head 112 with respect to the print sheet 104 after the sheet feeding operation is performed in S1002 of FIG. 4 is illustrated in (7-1).

(7-2) Detection

In the same manner as (6-2) described above, a relative positional relationship of the printing head 112 with respect to the print sheet 104 after the print sheet 104 is conveyed by the conveyance amount a to the sheet width detecting position in S1004 is illustrated in (7-2). As described above, the sheet sensor 118 is provided at the center of the printing head 112 in the conveyance direction of the print sheet 104. Therefore, unless the print sheet 104 is conveyed to the position of (6-2) in FIG. 6, the width of the print sheet 104 is not detectable by the sheet sensor 118.

Then, in the present embodiment, instead of conveying the print sheet 104 in the reverse direction, the ejecting portions are changed from those used in a case in which the width of the print sheet 104 is not detected. In this manner, suitable printing is performed. (7-3) of FIG. 7 illustrates conveyance of the print sheet 104 in the reverse direction for the sake of description. Such conveyance is not performed actually.

(7-3) Determination of Print Layout

In the same manner as (6-3) of FIG. 3, regarding the image 300 of printing target, a relative positional relationship of the printing head 112 with respect to the print sheet 104 in a case in which printing is started using a part (for example, ¼) of the ejecting portions of the printing head 112 as the ejecting portions A is illustrated in (7-3). A conveyance amount b to a print starting position after the detection of the width of the print sheet 104 in a case in which printing is started using the frontmost nozzle of the nozzle array of the printing head 112 (the lowermost nozzle in FIG. 7) is calculated. The conveyance amount b is defined with the conveyance direction of the print sheet 104 as positive (+) and b is smaller than 0 (b<0) in (7-3) since the print sheet 104 should be conveyed in the reverse direction in order to start printing using the frontmost nozzle of the nozzle array.

(7-4) Eject Portions Moved

The conveyance amount b calculated in (7-3) does not satisfy "conveyance amount b≥0" (in order to start printing using the frontmost nozzle of the nozzle array, the print sheet 104 should be conveyed in the reverse direction). Then, in the present embodiment, the nozzles used at the time of start of the printing are changed from the ejecting portions A to the ejecting portions B which are at a rear end of the nozzle array (uppermost nozzles in FIG. 7). Then, a moving amount c is calculated and the ejecting portions (nozzles) used at the time of start of the printing are changed from the ejecting portions A into the ejecting portions B.

(7-5) Determination of First Scanning Event

The conveyance amount d for using the ejecting portions B determined in (7-4) for the printing at a leading end of the image 300 of printing target is calculated. Then the print sheet 104 is conveyed by the conveyance amount d from the state in (7-2) and (7-4) and printing of the first scanning event is performed.

As illustrated in FIG. 7, in the present embodiment, the ejecting portions to be used in a case in which detection of the width of the print sheet is not performed are changed when the width of the printing sheet is performed. This enables suitable printing without conveyance of the print sheet in the reverse direction as illustrated in FIG. 6 and thus the configuration and time for the conveyance in the reverse direction can be made unnecessary.

The printing process illustrated in FIG. 7 may be multipass printing in which printing is completed in a predetermined area of the print sheet by a plurality of scanning event of the printing head 112 or may be one pass printing in which printing is completed in a predetermined area in a single scanning event. In the one pass printing, for example, printing may be performed using all the nozzles of the printing head 112 in a state of (7-5) of FIG. 7, the print sheet 104 may be conveyed in accordance with a conveyance amount corresponding to the nozzle array, and printing may be completed by printing the remaining portion of the image 300 of printing target.

Figure 8:
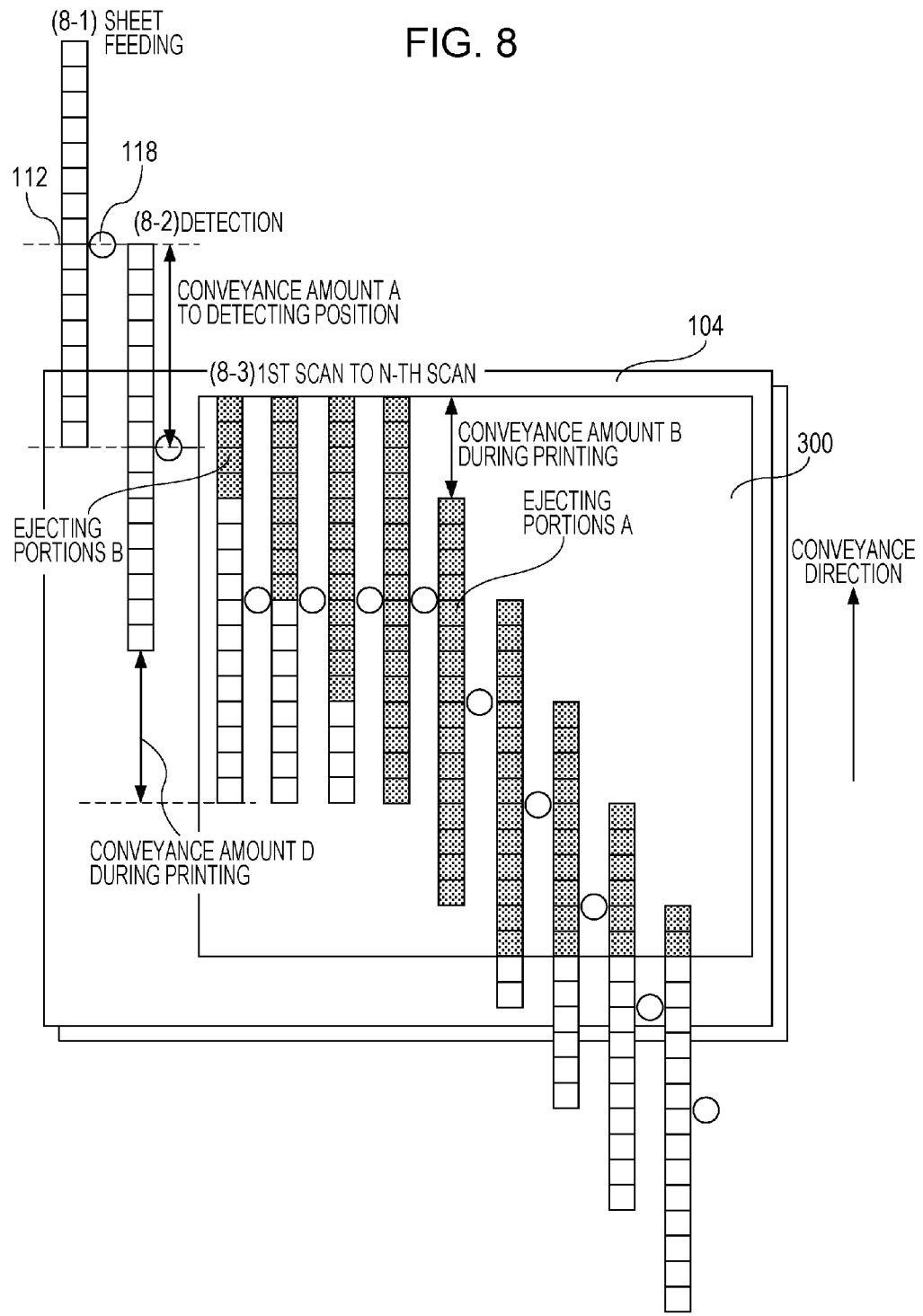
FIG. 8 is a diagram illustrating multipass printing in the present embodiment.

FIG. 8 is a diagram illustrating multipass printing in the present embodiment. FIG. 8 illustrates a relationship among the print sheet 104, the printing head 112 and the ejecting portions of the printing head 112 in time series seen from above of the printing apparatus 100.

(8-1) and (8-2) of FIG. 8 are similar to (7-1) to (7-5). In the state of (8-3), it is supposed that the change of the ejecting portions to be used for the printing and calculation of a conveyance amount d of the print sheet have been completed.

(8-3) First to N-th Scanning Events

The print sheet 104 is conveyed by the conveyance amount d and printing is performed using the ejecting portions B of the printing head 112 in the first scanning event.

In the example of FIG. 8, printing to a predetermined area of the print sheet is completed in four scanning events of the printing head 112. Therefore, in the two to four scanning events, printing is performed to the same area as in the first scanning event using the ejecting portions B of the printing head 112 as in the first scanning event without conveying the print sheet 104. After that, the print sheet 104 is conveyed by the conveyance amount b during the printing and the image 300 of printing target is printed.

The printing process described above and illustrated in FIGS. 7 and 8 will be described in detail with reference to FIG. 5. FIG. 5 is a diagram illustrating details of the process of S1009 in FIG. 4.

In S2001, the CPU 201 determines the ejecting portions A of the printing head 112 in accordance with the size of the print layout determined in S1008 of FIG. 4. The ejecting portions A are ejecting portions used at the time of start of the printing when the width of the print sheet is not to be detected and are variable values calculated depending on the print layout.

In S2002, the CPU 201 calculates the conveyance amount b of the print sheet 104 in the case in which the printing is started using the ejecting portions A calculated in S2001. Since the conveyance amount b is calculated in accordance with the position of the printing head 112 determined on the basis of the ejecting portions A determined in S2001 and the position of the printing head 112 at the time of the detection of the sheet width, the conveyance amount b is a variable value which changes depending on the print layout determined in S1008.

If the width of the print sheet is not detected, the leading end of the print sheet 104 fed in S1002 is positioned before the printing head 112 and conveyance of the print sheet 104 by the conveyance amount a in S1004 of FIG. 4 is not performed. Therefore, in this case, the conveyance amount b calculated in S2002 satisfies "conveyance amount b≥0" and the process proceeds to S2007.

If the width of the print sheet is to be detected, there is a case that "conveyance amount b≥0" is not satisfied as illustrated in FIGS. 6 and 7 and, in such a case, the process proceeds to S2004.

In S2004, the moving amount c of the ejecting portions B used at the time of start of the printing is calculated from ejecting portions A determined in S2001. In S2005, the ejecting portions used at the time of start of the printing are changed into the ejecting portions B from the ejecting portions A in accordance with the moving amount c calculated in S2004. The moving amount c of the ejecting portions is a variable value in a range of the ejecting portions of the printing head 112.

In the present embodiment, the maximum value of the moving amount is calculated. That is, the nozzle on the most downstream side in the conveyance direction of the print sheet 104 (the uppermost nozzle in FIG. 7) is used as the ejecting portions after the change. Thus, in the printing on the print sheet 104, the leading end of the print sheet 104 may arrive at the discharge rollers 115 and 116 in a shorter time. Therefore, falling of the leading end of the print sheet 104 on the platen 111 may be prevented and the distance between the printing head 112 and the print sheet 104 may be stabilized. The maximum value of the moving amount is not necessarily calculated as in the foregoing description but the maximum value of the moving amount may not be calculated from other reasons. The moving amount c is a value calculated from each of the plurality of nozzle arrays provided in the printing head 112 and is determined from the minimum moving amount of each nozzle array.

In S2006, the CPU 201 calculates the conveyance amount d of the sheet from the print layout determined in S1108 and the ejecting portions B determined in S2005. The conveyance amount d is a variable value calculated from the position of the printing head 112 determined from the ejecting portions B determined in accordance with the moving amount c.

In S2007, the CPU 201 controls the printing mechanism to convey the print sheet in accordance with the conveyance amount b or the conveyance amount d. Specifically, if "conveyance amount b≥0" is satisfied in S2003, the sheet is conveyed by the conveyance amount b and, if "conveyance amount b≥0" is not satisfied in S2003, the sheet is conveyed by the conveyance amount d determined in S2006.

In S2008, the CPU 201 performs printing on the print sheet 104 via the head control unit 213 through the ejecting portions A determined in S2001 or the ejecting portions B determined in S2005.

Next, in S2009, whether printing of the data of printing target has been completed is determined. If it is determined that the printing has not been completed, the process returns to S2001 and the processes of S2001 to S2008 are repeated until printing is completed. For example, in the multipass printing, since printing is not completed with a single process, the processes of S2001 to S2008 are repeated until printing is completed for each pass.

As described with reference to FIGS. 5, 7 and 8, the ejecting portions to be used in a case in which detection of the width of the print sheet is not performed are changed when the width of the printing sheet is performed. This enables suitable printing without conveyance of the print sheet in the reverse direction as illustrated in FIG. 6.

Although the print job is received from the host computer 208 connected via the interface in the embodiment described above, the print job may be received from a remote place connected by a telephone line or a network line. Although the host device which issues the print job is the smart device 208 in the description above, the host device may be a mobile phone, a personal computer, a digital television receiver and the like. The print job may be received directly from a device operated by the user or may be received indirectly via an intermediate device, such as a print server and a cloud service.

Next, another example of the present embodiment will be described. In the example of FIG. 5, the process for not performing the conveyance in the reverse direction is described. Here, an example in which conveyance in the reverse direction is performed under a predetermined condition in order to avoid degradation in image quality will be described.

For example, in the printing from the first to fourth scanning events in FIG. 8, printing is performed by a plurality of scanning events of the printing head 112 without conveying the print sheet 104 and printing is performed after the fifth scanning event while conveying the print sheet 104. That is, there are an area in which printing is performed while the print sheet 104 is not conveyed and an area in which printing is performed while the print sheet 104 is conveyed. In this case, in the print sheet 104 of FIG. 8, printing is performed using only four nozzles in the area printed using the upper four nozzles of the printing head 112 in the first to fourth scanning events. That is, the print data to be printed in the first scanning event is printed using the same ejecting portions 4 times, the print data extended in the second scanning event is printed using the same ejecting portions 3 times, and the print data extended in the third scanning event is printed using the same ejecting portions twice. The print data extended in the fourth scanning event is printed using different ejecting portions for each scanning event.

In the multipass printing, originally, degradation in image quality due to misalignment, with respect to the print sheet, of the landing position of the ink ejected from the nozzles of the printing head 112 may be prevented by printing using various nozzles of the printing head 112 to the predetermined area of the print sheet.

However, if printing is performed using the same ejecting portions in a plurality of scanning events as described above, image quality may be impaired. Therefore, in the next example of the present embodiment, printing is performed after the print sheet is conveyed in the reverse direction if, for example, image quality is more important as illustrated in FIG. 6 and printing is performed without conveying the print sheet in the reverse direction if, as illustrated in FIGS. 7 and 8, throughput (printing speed) is more important. Details of this process will be described with reference to FIG. 9.

Figure 9:
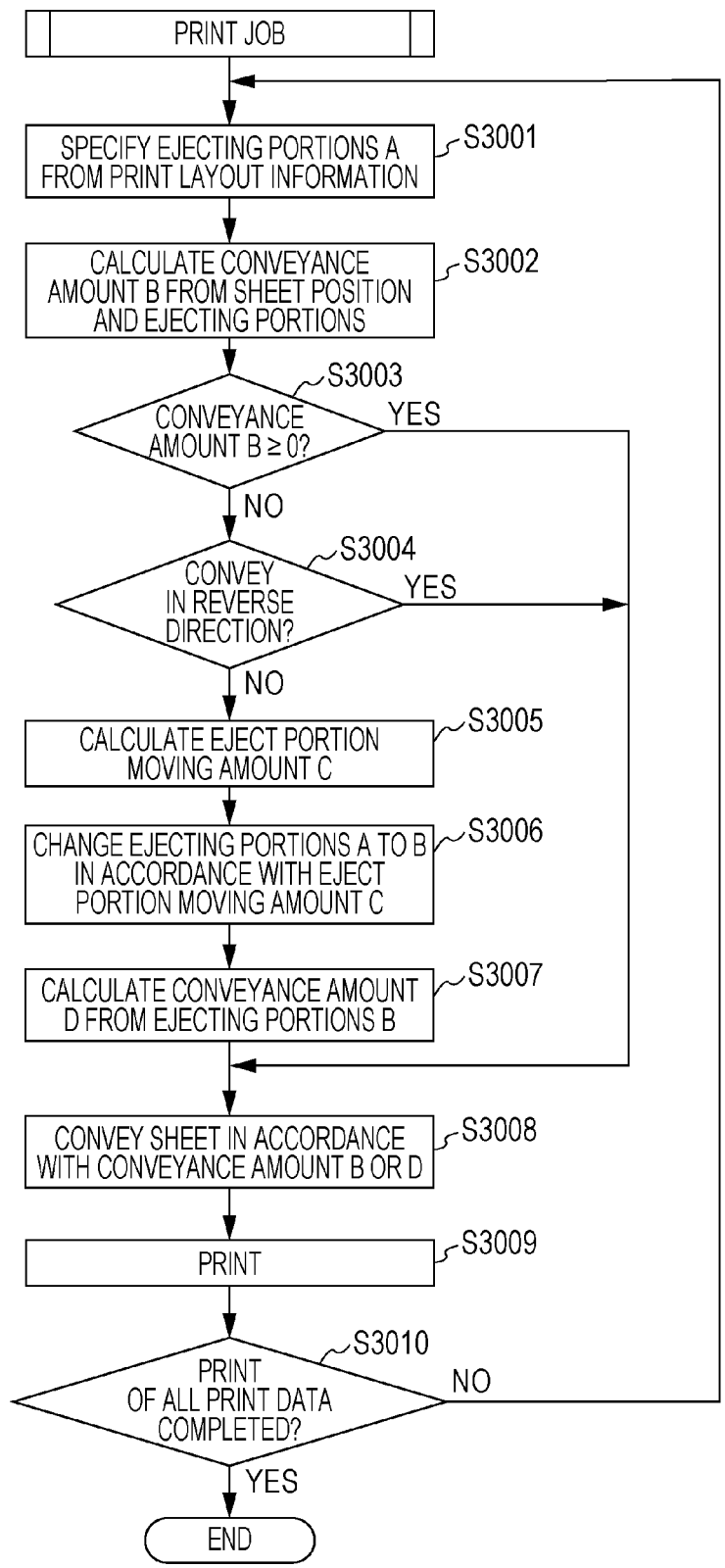
FIG. 9 is a flowchart illustrating details of the printing process.

FIG. 9 is a flowchart illustrating the content of the printing process in the present embodiment. FIG. 9 illustrates details of S1009 in FIG. 4.

Since S3001 to S3003 and S3005 to S3010 in FIG. 9 are the same processes as S2001 to S2003 and S2004 to S2009 in FIG. 5, respectively, detailed description thereof will be omitted.

In S3003, whether the condition of "conveyance amount b≥0" is satisfied. If this condition is not satisfied, it is determined in S3004 whether printing is started after the print sheet is conveyed in the reverse direction as illustrated in FIG. 6 or printing is started after the ejecting portions of the printing head 112 to be used are changed as illustrated in FIGS. 7 and 8.

The determination described above is performed under a predetermined condition in S3004 regarding, for example, which is more important for the printing corresponding to the print job received in S1000: image quality or throughput (printing speed). For example, if image quality is more important, the print sheet is conveyed in the reverse direction as illustrated in FIG. 6 and, if throughput (printing speed) is more important, printing is performed without conveying the print sheet in the reverse direction as illustrated in FIGS. 7 and 8.

Whether image quality is more important or printing speed is more important for that printing is determined depending on various types of information. For example, if print quality (a "clear" mode or a "fast" mode) is set in the print option setting set in the print job, the print quality is referred to. If the "clear" mode is set, it is determined that image quality is more important and, if the "fast" mode is set, it is determined that printing speed is more important. Further, if the sheet type set in the print option setting is "regular paper," it may be determined that printing speed is important and if other types of paper which are often more expensive than regular paper, such as "glossy paper," are set, it may be determined that image quality is more important.

If the set sheet size acquired in S1001 is the size often used for printing photographs, such as "L size" (89 mm×127 mm), "2 L size" (127 mm×178 mm), or "4×6 size" (127 mm×188 mm), it may be determined that image quality is more important and the print sheet may be conveyed in the reverse direction. If the set sheet size is the size often used for printing text, such as a letter size, it may be determined that printing speed is more important and ejecting portions may be changed as illustrated in FIGS. 7 and 8.

Further, the content of the image of printing target may be analyzed and, if a photograph is included, it may be determined that image quality is more important and, if only text is included, it may be determined that printing speed is more important.

If it is determined in S3004 that conveyance in the reverse direction is to be performed, the print sheet is conveyed in the reverse direction in S3008 and printing is performed in S3009. On the other hand, if it is determined in S3004 that conveyance in the reverse direction is not to be performed, the ejecting portions are changed in S3005 to S3007.

As described above, as illustrated in FIG. 8, when the print sheet 104 is conveyed to the position corresponding to the sheet sensor 118 for the detection of the width of the print sheet 104, whether the print sheet 104 is conveyed in the reverse direction or the ejecting portions used to be for the printing are changed is determined depending on the predetermined condition. Therefore, for example, if image quality is more important for the printing, the print sheet is conveyed in the reverse direction to implement high quality printing and, if printing speed is more important for the printing, the ejecting portions are changed and the print sheet is not conveyed in the reverse direction to implement high speed printing.

In the foregoing embodiment, an example is described in which the printing head 112 is provided in the carriage 113 and printing is performed by the printing head 112 which ejects the ink while scanning with respect to the print sheet 104. However, the printing head is not limited to the same and a linear head in which ejecting portions are arranged over the width of the print sheet may also be used. In a case in which a linear head is used, suitable printing may be performed without conveying the print sheet in the reverse direction by changing the ejecting portions.

In the foregoing embodiment, the print sheet is described as an example of a print medium on which an image is printed by the printing apparatus. However, the print medium is not limited to the same and an OHP sheet may also be used. Further, the print medium is not limited to rectangular shaped medium, such as print sheet, but may be a disc-like storage media, such as a CD and a DVD.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A program code for implementing the function of the present embodiment may be executed by one computer (CPU, MPU) or may be executed by a plurality of computers in cooperation. The program code may be executed by a computer. Alternatively, hardware, such as a circuit, for implementing the function of the program code may be provided. Alternatively, a part of the program code may be implemented by hardware, and the computer may perform the rest of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137042, filed Jun. 28, 2013, which is hereby incorporated by reference herein in its entirety.

What is claimed is:

1. A printing apparatus which prints an image on a print medium by a plurality of recording elements, comprising:
   a conveying unit configured to convey the print medium in a conveyance direction;
   an acquisition unit configured to acquire a width, in a direction which crosses the conveyance direction, of the print medium conveyed by the conveying unit, wherein the width is detected by a sensor arrange in the conveyance direction between the most upstream element and the most downstream element of the plurality of recording elements; and
   a printing unit configured to determine whether the width has been detected by the sensor, and in response to determining that the width has been detected by the sensor, configured to print, on the print medium, an image of a size in accordance with the acquired width of the print medium using the recording elements so that a first part of the recording elements is used for printing on an area which has been conveyed downstream from the sensor in the conveyance direction when the detection is performed.

2. The printing apparatus according to claim 1, wherein if the width of the print medium is detected by the sensor in printing of an image, the printing unit prints a part of the image corresponding to the area using the part of the recording elements arranged downstream from the sensor, and if the width of the print medium is not detected by the sensor in printing of the same image, the printing unit prints the same part of the same image using a part of the recording elements arranged upstream from the sensor.

3. The printing apparatus according to claim 2, wherein,
   in the printing, if the width of the print medium is detected by the sensor, the printing unit prints the part of the image by changing recording elements used for printing of the part of the image into recording elements on a downstream side in the conveyance direction from predetermined recording elements.

4. The printing apparatus according to claim 1 wherein
   the conveying unit conveys the print medium in accordance with a position of the print medium when the detection is performed, and a print starting position of the image on the print medium, and the printing unit prints the image on the conveyed print medium.

5. The printing apparatus according to claim 2, further comprising:
   a determination unit configured to determine, under a predetermined condition, whether detection of the print medium by the sensor is performed in the printing of the image,
   wherein, if it determined by the determination unit that the detection is to be performed, the printing unit prints the part of the image using the part of the recording elements arranged downstream from the sensor.

6. The printing apparatus according to claim 5, further comprising
   a receiving unit configured to receive a print job from an external device,
   wherein the determination unit determines whether the detection is to be performed in the printing corresponding to the print job in accordance with the reception by the receiving unit.

7. The printing apparatus according to claim 6, wherein the determination unit performs the determination with a condition based on at least one of the size of the print sheet set as print option setting in the print job and the type of the print sheet as the predetermined condition.

8. The printing apparatus according to claim 1, wherein the sensor is provided in a printing head in which the recording elements are provided.

9. The printing apparatus according to claim 2, wherein if the width of the print medium is detected by the sensor in printing of an image and a print starting position of the image is upstream side from the sensor when the detection is performed, the printing unit starts printing of the image using the part of the recording elements arranged upstream from the sensor.

10. A method of controlling a printing apparatus which prints an image on a print medium by a plurality of recording elements, the method comprising:
   acquiring a width in a direction, which crosses a conveyance direction, of the print medium conveyed in the printing apparatus, wherein the width is detected by a sensor arranged in the conveyance direction between the most upstream element and the most downstream element of the plurality of recording elements; and
   printing, on the print medium, an image of a size in accordance with the acquired width of the print medium using the recording elements so that a part of the recording elements arranged downstream from the sensor in the conveyance direction is used for printing on an area which has been conveyed downstream from the sensor in the conveyance direction when the detection is performed.

11. The method of controlling according to claim 10, wherein if the width of the print medium is detected by the sensor in printing of an image, a part of the image corresponding to the area is printed using the part of the recording elements arranged downstream from the sensor, and if the width of the print medium is not detected by the sensor in printing of the same image, the same part of the same image is printed using a part of the recording elements arranged upstream from the sensor.

12. The method of controlling according to claim 11, wherein,
   in the printing, if the width of the print medium is detected by the sensor, the printing unit prints the part of the image by changing recording elements used for printing of the part of the image into recording elements on a downstream side in the conveyance direction from predetermined recording elements.

13. The method of controlling according to claim 10, wherein
   the printing apparatus conveys the print medium in accordance with a position of the print medium when the detection is performed, and a print starting position of the image on the print medium and in the printing, the image is printed on the conveyed print medium.

14. The method of controlling according to claim 11, further comprising
   determining, under a predetermined condition, whether detection of the print medium by the sensor is performed in the printing of the image, wherein, if it determined in the determining that the detection is to be performed, printing the part of the image using the part of the recording elements arranged downstream, from the sensor.

15. The method of controlling according to claim 14, further comprising receiving a print job from an external device, wherein, in the determining, determination as to whether the detection is to be performed in the printing corresponding to the print job is made in accordance with the reception in the receiving.

16. The method of controlling according to claim 15, wherein, in the determining, the determination is made with a condition based on at least one of the size of the print sheet set as print option setting in the print job and the type of the print sheet as the predetermined condition.

17. The method of controlling according to claim 10, wherein the sensor is provided in a printing head in which the recording elements are provided.

18. The method of controlling according to claim 11, wherein if the width of the print medium is detected by the sensor in printing of an image and a print starting position of the image is an upstream side from the sensor when the detection is performed, printing of the image is started using the part of the recording elements arranged upstream from the sensor.

19. A non-transitory storage medium in which a program for making a computer execute the method of controlling according to claim 10 is stored.

20. The printing apparatus according to claim 1, wherein the width corresponding to a leading end of the print medium is detected by the sensor and the area corresponds to the leading end of the print medium.

* * * * *